(12) United States Patent  
Johnson et al.

(10) Patent No.: US 6,183,091 B1  
(45) Date of Patent: Feb. 6, 2001

(54) COLOR IMAGING SYSTEMS AND METHODS

(75) Inventors: Kristina M. Johnson, Longmont; Gary D. Sharp, Boulder, both of CO (US)

(73) Assignee: ColorLink, Inc., Boulder, CO (US)

( * ) Notice: Under 35 U.S.C. 154(b), the term of this patent shall be extended for 0 days.

(21) Appl. No.: 09/311,587

(22) Filed: May 14, 1999

Related U.S. Application Data

(63) Continuation-in-part of application No. 09/190,273, filed on Nov. 13, 1998, which is a continuation-in-part of application No. 09/126,330, filed on Jul. 31, 1998, which is a continuation-in-part of application No. 08/853,468, filed on May 9, 1997, now Pat. No. 5,990,996, and a continuation-in-part of application No. 08/645,580, filed on May 14, 1996, now Pat. No. 5,822,021, and a continuation-in-part of application No. 09/165,127, filed on Oct. 2, 1998, which is a continuation-in-part of application No. 08/855,716, filed on May 8, 1997, now Pat. No. 5,853,083, which is a continuation of application No. 08/447,522, filed on May 23, 1995, now Pat. No. 5,751,384, and a continuation-in-part of application No. 09/215,208, filed on Dec. 18, 1998, now Pat. No. 6,078,374, which is a continuation-in-part of application No. 08/901,837, filed on Jul. 28, 1997, now Pat. No. 6,046,786, which is a continuation of application No. 08/419,593, filed on Apr. 7, 1995, now Pat. No. 5,658,490.

(60) Provisional application No. 60/113,005, filed on Dec. 18, 1998.

(51) Int. Cl.[7] .................................................. G03B 21/14
(52) U.S. Cl. ................................... 353/20; 353/33; 349/9
(58) Field of Search ................................ 353/20, 31, 33, 353/34, 37, 81; 349/8, 9

(56) References Cited

U.S. PATENT DOCUMENTS

| | | | |
|---|---|---|---|
| 2,493,200 | 1/1950 | Land | 88/112 |
| 2,638,816 | 3/1953 | Stolzer | 88/61 |
| 3,967,881 | 7/1976 | Moriyama | 350/150 |
| 4,003,081 | 1/1977 | Hilsum et al. | 358/64 |
| 4,019,808 | 4/1977 | Scheffer | 350/160 LC |
| 4,025,164 | 5/1977 | Doriguzzi et al. | 350/160 LC |
| 4,232,948 | 11/1980 | Shanks | 350/347 |

(List continued on next page.)

FOREIGN PATENT DOCUMENTS

| | | | |
|---|---|---|---|
| 4029838 | 3/1991 | (DE) | 349/97 |
| 56-137307A | 10/1981 | (JP) . | |

(List continued on next page.)

OTHER PUBLICATIONS

Sharp, Gary Dean. "Chiral smectic liquid crystal tunable optical fibers and modulators", 1992.

Scheffer, T.J., "New multicolor liquid crystal displays that use a twisted nematic electro–optical cell, "J., Appl. Phys. (1973) 44(11):4799–4803.

(List continued on next page.)

*Primary Examiner*—William Dowling  
(74) *Attorney, Agent, or Firm*—Fleshner & Kim, LLP

(57) ABSTRACT

A system for separating light into different spectrums and for recombining the light includes at least one polarizing beamsplitter and at least one retarder stack configured to condition the polarization of input light differently for different spectrums. A device embodying the invention could utilize multiple polarizing beamsplitters and multiple retarder stacks. Alternatively, a system could utilize a single polarizing beamsplitter and a single retarder stack in combination with one or more dichroic beamsplitters. In preferred embodiments, one or more reflective modulator panels are included to separately modulate each separated spectrum of light. Such an embodiment can be used for a color projection system. In each of the embodiments that utilize modulators, distances between the modulators and the focusing optics is essentially the same.

59 Claims, 5 Drawing Sheets

U.S. PATENT DOCUMENTS

| | | | |
|---|---|---|---|
| 4,367,924 | 1/1983 | Clark et al. | 350/334 |
| 4,416,514 | 11/1983 | Plummer | 350/335 |
| 4,448,823 | 5/1984 | Clifford | 428/1 |
| 4,497,543 | 2/1985 | Aoki et al. | 350/337 |
| 4,566,761 | 1/1986 | Carlsen et al. | 350/401 |
| 4,575,193 | 3/1986 | Greivenkamp, Jr. | 350/401 |
| 4,582,396 | 4/1986 | Bos et al. | 350/347 |
| 4,635,051 | 1/1987 | Bos et al. | 340/757 |
| 4,652,087 | 3/1987 | Bos et al. | 350/332 |
| 4,668,086 | 5/1987 | Redner | 356/33 |
| 4,685,773 | 8/1987 | Carlsen et al. | 350/401 |
| 4,758,818 | 7/1988 | Vatne | 340/701 |
| 4,759,612 | 7/1988 | Nakatuka et al. | 350/337 |
| 4,770,500 | 9/1988 | Kalmanash et al. | 350/347 E |
| 4,770,525 | 9/1988 | Umeda et al. | 353/122 |
| 4,786,146 | 11/1988 | Ledebuhr | 350/331 R |
| 4,786,964 | 11/1988 | Plummer . | |
| 4,796,978 | 1/1989 | Tanaka et al. | 350/337 |
| 4,808,501 | 2/1989 | Chiulli . | |
| 4,834,508 | 5/1989 | Fergason | 350/339 F |
| 4,867,536 | 9/1989 | Pidsosny et al. | 350/337 |
| 4,917,464 | 4/1990 | Conner | 350/335 |
| 4,917,465 | 4/1990 | Conner et al. | 350/335 |
| 4,966,441 | 10/1990 | Conner | 350/335 |
| 4,995,702 | 2/1991 | Aruga . | |
| 5,032,007 | 7/1991 | Silverstein et al. | 350/335 |
| 5,033,825 | 7/1991 | Ishikawa et al. | 350/339 |
| 5,050,965 | 9/1991 | Conner et al. | 359/53 |
| 5,111,315 | * 5/1992 | Ledebuhr | 353/20 |
| 5,122,887 | 6/1992 | Mathewson | 349/97 |
| 5,124,818 | 6/1992 | Conner | 359/53 |
| 5,126,864 | 6/1992 | Akiyama et al. | 350/337 |
| 5,132,826 | 7/1992 | Johnson et al. . | |
| 5,179,459 | 1/1993 | Plesinger | 359/74 |
| 5,220,447 | 6/1993 | Yokokura et al. | 359/93 |
| 5,231,432 | 7/1993 | Glenn . | |
| 5,235,443 | 8/1993 | Barnik et al. | 359/37 |
| 5,237,435 | 8/1993 | Kurematsu et al. | 359/41 |
| 5,243,455 | 9/1993 | Johnson et al. | 359/93 |
| 5,249,071 | 9/1993 | Yoshimizu et al. | 359/63 |
| 5,268,782 | 12/1993 | Wenz et al. | 359/81 |
| 5,276,436 | 1/1994 | Shaw et al. . | |
| 5,295,009 | 3/1994 | Barnik et al. | 395/65 |
| 5,299,039 | 3/1994 | Bohannon | 359/53 |
| 5,321,450 | 6/1994 | Shapiro et al. . | |
| 5,337,103 | 8/1994 | Gulick . | |
| 5,337,174 | 8/1994 | Wada et al. | 359/73 |
| 5,347,378 | 9/1994 | Handschy et al. | 359/53 |
| 5,353,075 | 10/1994 | Connor et al. . | |
| 5,355,188 | 10/1994 | Biles et al. . | |
| 5,369,513 | 11/1994 | Akatsuka et al. | 359/73 |
| 5,374,968 | * 12/1994 | Haven et al. | 353/20 |
| 5,381,253 | 1/1995 | Sharp et al. . | |
| 5,400,095 | 3/1995 | Minich et al. . | |
| 5,422,756 | 6/1995 | Weber | 359/487 |
| 5,469,279 | 11/1995 | Sharp et al. | 359/53 |
| 5,500,523 | 3/1996 | Hamanaka | 250/216 |
| 5,510,861 | 4/1996 | Minich . | |
| 5,528,393 | 6/1996 | Sharp et al. | 359/53 |
| 5,534,949 | 7/1996 | Baron | 348/742 |
| 5,559,634 | 9/1996 | Weber | 359/638 |
| 5,565,933 | 10/1996 | Reinsch | 348/742 |
| 5,574,580 | 11/1996 | Ansley | 359/41 |
| 5,585,950 | 12/1996 | Nishino et al. | 349/118 |
| 5,608,551 | 3/1997 | Biles et al. | 359/95 |
| 5,619,355 | 4/1997 | Sharp et al. | 349/78 |
| 5,658,490 | 8/1997 | Sharp et al. | 252/299.01 |
| 5,686,931 | 11/1997 | Fünfschilling et al. | 345/88 |
| 5,689,317 | 11/1997 | Miller | 349/97 |
| 5,739,881 | 4/1998 | Xu et al. | 349/118 |
| 5,774,264 | 6/1998 | Konno et al. | 359/497 |
| 5,777,709 | 7/1998 | Xu et al. | 349/120 |
| 5,833,360 | 10/1998 | Knox | 362/293 |

FOREIGN PATENT DOCUMENTS

| | | |
|---|---|---|
| 0121379 | 5/1988 | (JP) . |
| 63-182987A | 7/1988 | (JP) . |
| 03028823A | 2/1991 | (JP) . |
| 4022920 | 1/1992 | (JP) . |
| 04207774A | 7/1992 | (JP) . |
| 7-84218 | 3/1995 | (JP) . |
| WO95/26110 | 9/1995 | (WO) . |

OTHER PUBLICATIONS

Carlsen, W.J. and Buhrer, C.F., "Flat Passband Birefringent Wavelength–Division Multiplexers," Electronics Letters (1978) 23(3):106–107.

Wright, H., et al., "Active filters enable color imaging," Laser Focus World (May 1996) 85–90.

Cambridge Research & Instrumentation, Inc., "Liquid Crysatal Tunable Filter," Cambridge, MA 2 pages.

Displaytech, Inc. (Jan., 1996), "Switchable Color Filter", Boulder, CO, 4 pages.

Title, A.M. and Rosenberg, W.J., "Tunable birefringent filters, "Opt. Eng., (1981) 20(6):815–823.

Solc, Ivan, "Birefringent Chain Filters, "J. Opt, Soc. Am. (1965) 55(6):621–625.

Wu, Shin–Tson, "Birefringence dispersions of liquid crystals, "Physical Review A. (1986) 33(2):1270–1274.

Harris, S.E., et al., "Optical Network Synthesis Using Birefringent Crystals, I. Synthesis of Lossless Networks of Equal–Length Crystal, "J. Opt. Soc. America (1964) 54(10):1267–1279.

Amman, E.O., "Optical Network Synthesis Using Birefringent Crystals, III., Some General Properties of Lossless Birefringent Networks, "J. Opt. Soc America (1966) 56(7):943–951.

Amman, E.O. and Yarborough, J.M., "Optical Network Synthesis Using Birefringent Crystals V. Synthesis of Lossless Networks Containing Equal–Length Crystals and Compensators, "J. Opt. Soc America (1966) 56(12): 1746–1754.

Sharp. G.D., et al., "P–60: Color Switching Using Ferroelectric Liquid Crystals, "Society for Information Display, International Symposium, Digest of Technical Papers, Vo., XXIV, Seattle, Washington, May 18–20, 1993.

Kondo, et al., "Ferroelectric Liquid Crystal Materials Applied to Guest–Host Type Displays," Ferroelectrics (1988) 85:361–373.

Billings, BH., "A Tunable Narrow–Band Optical Filter, "J., Opt. Soc. America (1947) 37:738–746.

Buhrer, Carl F., "Synthesis and tuning of high–order birefringent filters," Applied Optics (Apr. 20, 1994) 33(12): 2249–2254.

Y. Wang; "Surface Plasmon Tunable Color Filter and Display Device;" Society for Informaion Display International Symposium Digest of Technical Papers; vol. 28, pp. 63–66, May 1997.

F.H. Yu and H.S. Kwok; "A New Driving Scheme for Reflective Bistable Cholesteric LCDs;" 1997 Society for Information Display Information Symposium Digest of Technical Papers; p. 659, May, 1997.

Y. Nakai, "A Reflective Tri–Layer Guest–Host Color TFT–LCD:" 1997 Society for Information Display International Symposium Digest of Technical Papers; p. 83, May, 1997.

Bernard M. Schiffman, et al., "Birefringent Filter for Millimeter Waves," IEEE Transactions on Microwave Theory and Techniques, vol. MIT–16, No. 6, Jun. 1968.

* cited by examiner

COLOR IMAGING SYSTEMS AND METHODS

This application is a continuation-in-part of U.S. application Ser. No. 09/190,273, filed Nov. 13, 1998, which in turn is a continuation-in-part of U.S. patent application Ser. No. 09/126,330, filed Jul. 31, 1998, which is a continuation-in-part of application Ser. No. 08/853,468, filed May 9, 1997, now U.S. Pat. No. 5,990,996 and a continuation-in-part of application Ser. No. 08/645,580, filed May 14, 1996, which is now issued as U.S. Pat. No. 5,822,021. This application is also a continuation-in-part of application Ser. No. 09/165,127, filed Oct. 2, 1998, which is a continuation-in-part of application Ser. No. 08/855,716, filed on May 8, 1997, now U.S. Pat. No. 5,953,083 which is a continuation of application Ser. No. 08/447,522, filed on May 23, 1995, which is now issued as U.S. Pat. No. 5,751,384.

This application is also a continuation-in-part of provisional application Ser. No. 60/113,005, filed Dec. 18, 1998.

This application is also a continuation-in-part of application ser. No. 09/215,208, filed Dec. 18, 1998, now U.S. Pat. No. 6,078,374 which is a continuation-in-part of application Ser. No. 08/901,837, filed Jul. 28, 1997, now U.S. Pat. No. 6,046,786 which is a continuation of application Ser. No. 08/419,593, filed Apr. 7, 1995, which is now issued as U.S. Pat. No. 5,658,490.

The disclosures of all the above-listed applications are hereby incorporated by reference.

BACKGROUND OF THE INVENTION

1. Field of the Invention

This invention relates to color imaging systems and methods. In particular, this invention is related to systems and methods of separating different light into two or more spectrums, modulating the separated spectrums, and re-combining the modulated spectrums to create color images.

2. Background of the Related Art

Some prior art color image projector systems separate input light into three primary colors, separately modulate the colors, and recombine the modulated color images to create a consolidated, modulated color image. Prior art systems typically separate input white light into multiple colors using multiple dichroic beamsplitters. Usually, a first dichroic beamsplitter will separate the white light into a first primary color, and a complementary color. The complementary color light is then further separated into second and third primary colors by a second dichroic beamsplitter. Once the white light has been separated into three primary color beams, the light beams are separately modulated. Additional dichroic elements are then used to re-combine the modulated beams.

The dichroic beamsplitters used in these prior art systems typically use a thin film of a dichroic material that is deposited on a transparent substrate, or sandwiched between two shaped transparent elements. Unfortunately, the performance of the dichroic thin film material is poor off-axis. Thus, the performance of devices using the dichroic beamsplitters is usually poor off-axis.

The dichroic thin films used in the prior art systems are intended to act on light based only on wavelength. The polarization orientation of the light passing through the dichroic elements should not matter, and the dichroic elements should not change the polarization orientation of the light. In practice, however, the polarization orientation of the light does have an effect on how the dichroic thin films affect the light.

If a prior art system utilizes liquid crystal modulators, the light may be polarized into specific orientations to allow the modulators to perform their function. This polarization orientation can affect how the dichroic thin films perform the color separation function. In addition, if the liquid crystal modulators are reflective panels, the colored light will usually pass through a dichroic thin film a first time with a first polarization orientation, and then a second time with a different polarization orientation. Because the polarization orientation changes, the dichroic thin film will operate on the light differently during each pass. All these effects combine to deteriorate the performance of the prior art systems.

In addition, to improve color saturation, many of the prior art devices that utilize dichroic beamsplitters to separate light into three primary colors also utilize notch or band-pass filters to remove light having wavelengths between the three primary colors. For instance, notch filters are often used to remove cyan and yellow "pastel" colors. The removal of the pastel colored light reduces the brightness of the resulting color images.

SUMMARY OF THE INVENTION

The present invention is directed to systems and methods that utilize one or more polarizing beamsplitters to separate light into different color spectrums.

In a system embodying the present invention, at least one retarder stack is used to condition input light so that different spectrums of the light have different polarization orientations. One or more polarizing beamsplitters are then used to separate the different spectrums based on their respective polarization orientations. The separated color spectrums are then modulated with respective modulators, and the modulated spectrums are re-combined to create a consolidated, modulated color image.

In preferred embodiments of the invention, the polarizing beamsplitters are also used to accomplish the recombination of the different modulated color spectrums. Also, preferred embodiments may utilize reflective liquid crystal modulator panels that selectively modulate the polarization orientation of the different spectrums. The polarization change imparted by such modulators can also be used to control the direction of progression of the light through the system.

A system that separates input light into different spectrums, separately modulates the spectrums, and then re-combines the spectrums, must operate so that the re-combined image is properly re-integrated. If projection lenses are used to project the image, the modulators that perform the modulation function for each color must all be located at substantially the same distance from the projections lenses to ensure that the magnification is the same for each of the separate color images. If this does not occur, the image may be blurred or distorted. Embodiments of the present invention have their beam splitting and recombining elements arranged so that the same effective distance exists between the projection lenses and each modulator.

Systems embodying the invention that utilize reflective liquid crystal modulator panels may also utilize light doublers, as described later in the application. Although ferroelectric liquid crystal modulators require DC balancing, which results in alternating inverse images, the light doublers allow the inverse images to be converted to normal images. Thus, every frame of the image data can be output by the system, and brightness is maximized.

Systems embodying the present invention can also utilize output retarder stacks that orient all the different modulated spectrums into the same polarization orientation. If projection lenses are used to project the resulting consolidated, modulated color image, the unitary polarization orientation can improve the efficiency of the lens system.

Preferred embodiments of the system may also include both a polarizing beamsplitter and a dichroic beamsplitter. In this type of embodiment, a retarder stack and the polarizing beamsplitter can be used to separate the input light into two spectrums, and the dichroic beamsplitter can be used to separate one of the spectrums into two additional spectrums. Each of the resulting three spectrums can then be separately modulated with respective modulators. The modulated spectrums can then be re-combined using the same dichroic beamsplitter and polarizing beamsplitter.

Because polarizing beamsplitters do not have the same off-axis problems described above for dichroic thin films, systems embodying the present invention have much better off-axis performance. Also, because systems embodying the present invention do not rely exclusively on dichroic thin films to separate the light into different spectrums, the use of reflective liquid crystal modulators does not negatively impact system performance.

The retarder stacks that condition the light so that it will have certain polarization orientations can also be designed to block or reflect the "pastel" wavelengths between the primary colors. This eliminates the need for separate notch filters, and may help to improve the overall efficiency or brightness of the system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings, in which like reference numerals refer to like elements, and wherein.

DETAILED DESCRIPTION OF PREFERRED EMBODIMENTS

Figure 1:
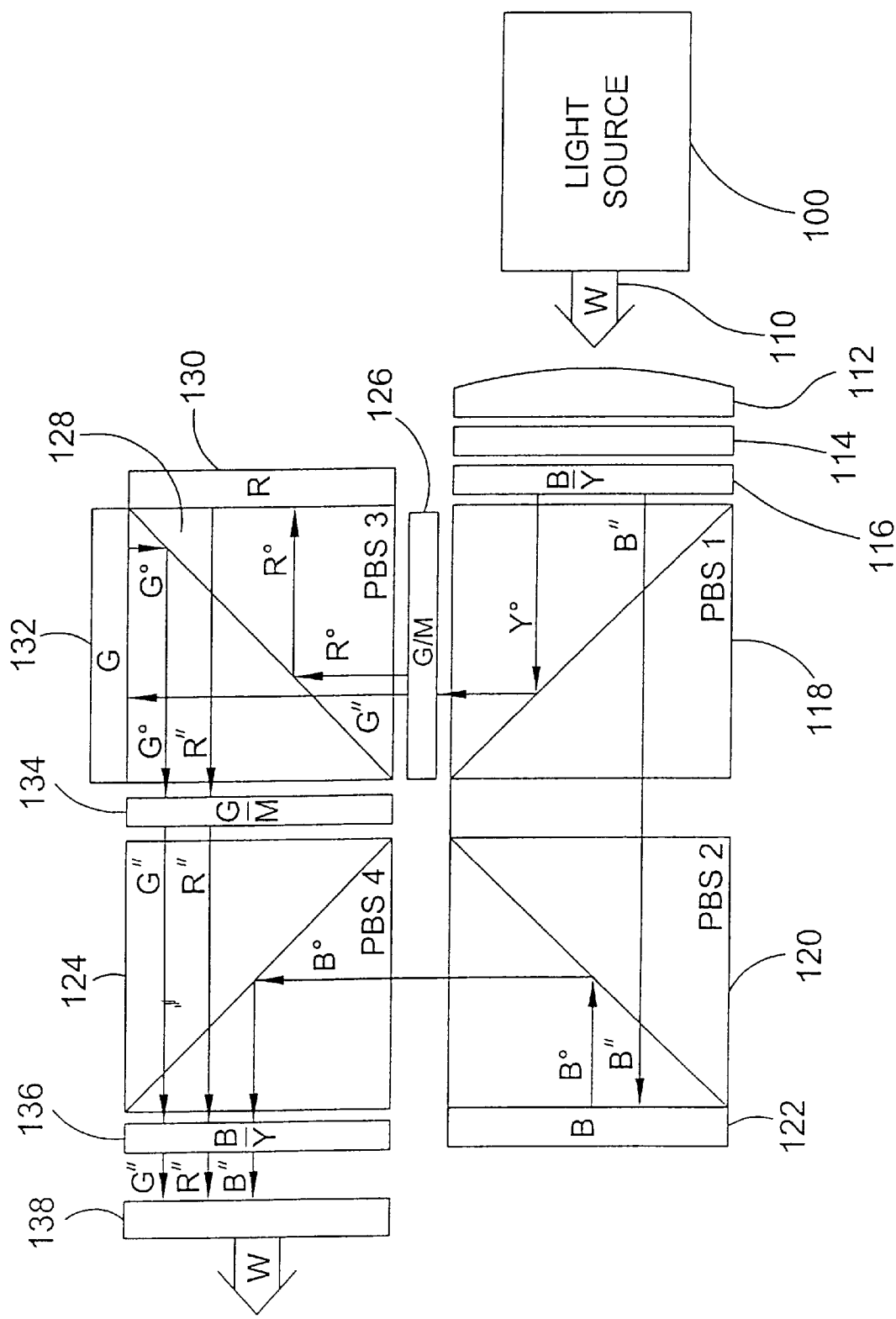
FIG. 1 is a diagram of a first embodiment of the present invention.

In the drawings, arrowed lines indicate the directions that light travels through the systems. The arrowed lines are labeled to indicate the color of the light, and the polarization orientation. A capitol R indicates red light, a capitol G indicates green light, and a capitol B indicates blue light.

For purposes of discussion, the following descriptions will refer to two different polarization states. The first polarization state will be the "P state," and the second polarization state will be the "S state." A superscript symbol next to a letter indicating the color of a light beam indicates the polarization state of the light. A superscript symbol comprising two parallel lines indicates the P polarization state. A superscript circle symbol indicates the S polarization state.

FIG. 1 shows a first embodiment of the invention that utilizes four retarder stacks and four polarizing beamsplitters. In this embodiment, white light 110 from a light source 100 is collimated by collimating lens 112. The light is then polarized by a polarizer 114 so that it has the S polarization orientation.

A first retarder stack 116 is positioned between the light source 100 and a first polarizing beamsplitter 118. The first retarder stack 116 is designed to modulate the polarization orientation of blue light, but to allow the polarization state of yellow light (which is comprised of red and green light) to remain unchanged. This type of retarder stack is known as a Blue/Yellow retarder stack.

As the polarized input light passes through the first retarder stack 116, the polarization state of the blue light will be rotated into the P orientation, and the red and green components of the light will keep the S polarization orientation. Thus, two arrows are shown exiting the first retarder stack 116. A first arrow, indicating the blue light having the P orientation, is labeled $B^{\|}$, and a second arrow, indicating yellow light (red and green), is labeled $Y^{\circ}$.

The embodiment shown in FIG. 1 includes four polarizing beamsplitters 118, 120, 124, 128. Each polarizing beamsplitter has a square cross section with a diagonal line passing through the square. Each of the polarizing beamsplitters is configured to allow light having the P polarization orientation to pass through the splitters without deflection. The polarizing beamsplitters are also configured to deflect light having the S orientation by 90 degrees. The light is effectively reflected along the, diagonal lines.

The blue light leaving the first retarder 116 will pass straight through the first polarizing beamsplitter 118 because it has the P polarization orientation. The yellow light, because it has the S polarization orientation, will be reflected upward by the first polarizing beamsplitter 118.

Because the blue light has the P orientation, it will then pass straight through the second polarizing beamsplitter 120, and impinge on a first reflective modulator panel 122. The reflective modulator panel 122 is configured to selectively rotate the polarization orientation of the incident light in a spatial pattern based on control signals. In a preferred embodiment, the reflective modulator panel will operate in a binary fashion such that the reflected light leaves the modulator panel with either the P orientation, which is the same polarization orientation in which it arrived, or the S orientation. The reflected light with the P orientation can be considered unmodulated, since the polarization orientation does not change. The reflected light having the S orientation, can be considered modulated.

The unmodulated reflected blue light, which has the P orientation, will then pass straight back through the second polarizing beamsplitter 120 and the first polarizing beamsplitter 118, and then on to the light source. The reflected modulated blue light, having the S orientation, will be reflected upward by the second polarizing beamsplitter 120 towards the fourth polarizing beamsplitter 124. When the modulated blue light, having the S orientation, enters the fourth polarizing beamsplitter, it will be reflected toward an output end located on the top left of the drawing.

Returning now to the yellow light reflected upward by the first polarizing beamsplitter 118, the yellow light leaves the first polarizing beamsplitter 118 and passes through a second retarder stack 126. In this embodiment, the second retarder stack 126 is a Green/Magenta retarder stack, which means that the polarization orientation of the green light is rotated, and the polarization of any magenta light (which includes red and blue) is unaffected. Thus, as the yellow light passes through the second retarder stack 126, the green portion is rotated so that it has the P orientation, and the red portion is unaffected.

The red light leaving the second retarder stack 126 enters the third polarizing beamsplitter 128, and because it has the S orientation, it is reflected towards a second reflective modulator panel 130. The second reflective modulator panel 130 operates like the first reflective modulator panel 122 described above. Unmodulated portions of the red light are reflected from the modulator panel with the S orientation, which is the same orientation in which it arrived. Modulated portions of the red light are reflected with the P orientation.

The unmodulated red light, because it still has the S orientation, will be reflected downwards by the third polarizing beamsplitter 128. The unmodulated red light will then pass back through the second retarder stack 126, without a polarization change, and into the first polarizing beamsplitter 118. The unmodulated red light will then be reflected by the first polarizing beamsplitter 118 back towards the light source.

The modulated red light reflected from the second reflective modulator panel 130, because it has the P orientation, will pass straight through the third polarizing beamsplitter 128, and into a third retarder stack 134. In this embodiment, the third retarder stack is also a Green/Magenta retarder stack, so the red light will pass through the third retarder stack 134 without a change in its polarization orientation. The modulated red light will then pass straight through the fourth polarizing beamsplitter 124 and to an output end of the system.

The green light entering the third polarizing beamsplitter 128, having the P orientation, will passes straight through the third polarizing beamsplitter 128, and impinge on a third reflective modulator panel 132. The third reflective modulator panel 132 operates like the first modulator panel 122 and second modulator panel 130. Thus, unmodulated green light will be reflected with the P polarization orientation, which is the same orientation in which it arrived. Modulated green light will be reflected with the S orientation.

The unmodulated green light, having the P orientation, will pass straight back through the third polarizing beamsplitter 128, and into the second retarder stack 126. The second retarder stack will rotate the unmodulated green light into the S orientation as it passes toward the first polarizing beamsplitter 118. The unmodulated green light, now having the S orientation, will then be reflected by the first polarizing beamsplitter 118 back toward the light source.

The modulated green light, having the S orientation, will be reflected by the third polarizing beamsplitter 128 towards the third retarder stack 134. As the modulated green light passes through the third retarder stack 134, it will be rotated into the P orientation. The modulated green light, now having the P orientation, will pass straight through the fourth polarizing beamsplitter 124 and toward an output end of the system.

A fourth retarder stack 136 is located at the exit side of the fourth polarizing beamsplitter 124. In this embodiment, the fourth retarder stack is a Blue/Yellow retarder stack, just like the first retarder stack 116. Thus, the retarder stack will rotate the polarization orientation of blue light, but allow yellow light (red and green) to pass through without a polarization change.

The modulated green light and the modulated red light passing out of the fourth polarizing beamsplitter 124 will pass through the fourth retarder stack 136 without a change in polarization orientation. The modulated blue light leaving the fourth polarizing beamsplitter 124 will pass through the fourth retarder stack 136 and be rotated into the P orientation. Thus, the light exiting the fourth retarder stack will include modulated red, green and blue images, all of which are in the same polarization orientation. This three color modulated image will then be focused by projection optics 138.

In this embodiment, each of the reflective modulator panels is located substantially the same distance from the projection optics 138. Thus, the three different color images produced by the modulator panels will be magnified the same amount, and the resulting composite image will be sharp and in-focus.

In the embodiment described above, and in the embodiments which follow, the reflective modulator panels could be any type of reflective modulator panel capable of modulating the polarization orientation of the reflected light. This could include nematic and ferroelectric liquid crystal reflective modulators. Ferroelectric liquid crystal displays switch fast and are binary, which may make the control system easy to implement. On the other hand, nematic liquid crystals, because they can be controlled in an analog fashion, can make it easier to create grayscale images.

Although ferroelectric liquid crystal modulators are preferred, they have one relevant drawback. Due to impurities in the liquid crystal materials, it is desirable to alternate the polarity of the voltage applied to each of the pixels of the modulator panel during successive frames of data This is known as DC balancing. The DC balancing helps to ensure that impurities in the liquid crystal material do not migrate to one side or the other of the cells.

When DC balancing is carried out, and the voltage polarity is reversed on each cell of a ferroelectric liquid crystal modulator, during successive frames. The voltage polarity change results in a polarization orientation change for the modulated light. Thus, alternating frames of images data will appear as inverses of one another. A white pixel in a first frame will appear black in the next frame, and vice versa.

One way to eliminate the problem caused by DC balancing is to simply block every other frame of image data. However, this approach results in losing half the light produced by the system, which is very undesirable.

A better approach is to use "light doublers" which are described in U.S. provisional application Ser. No. 60/113, 005, the contents of which is hereby incorporated by reference. A light doubler can be positioned adjacent a ferroelectric liquid crystal display panel and, when energized, operates to convert a frame of image data into its inverse. Thus, the light doubler is energized during every other frame of image data to convert the inverse frame produced by the ferroelectric liquid crystal panel back into a normal image. Use of the light doubler eliminates the need to blank the inverse frames that result from DC balancing of the ferroelectric liquid crystal modulators, thus doubling the light output by the system.

Figure 2:
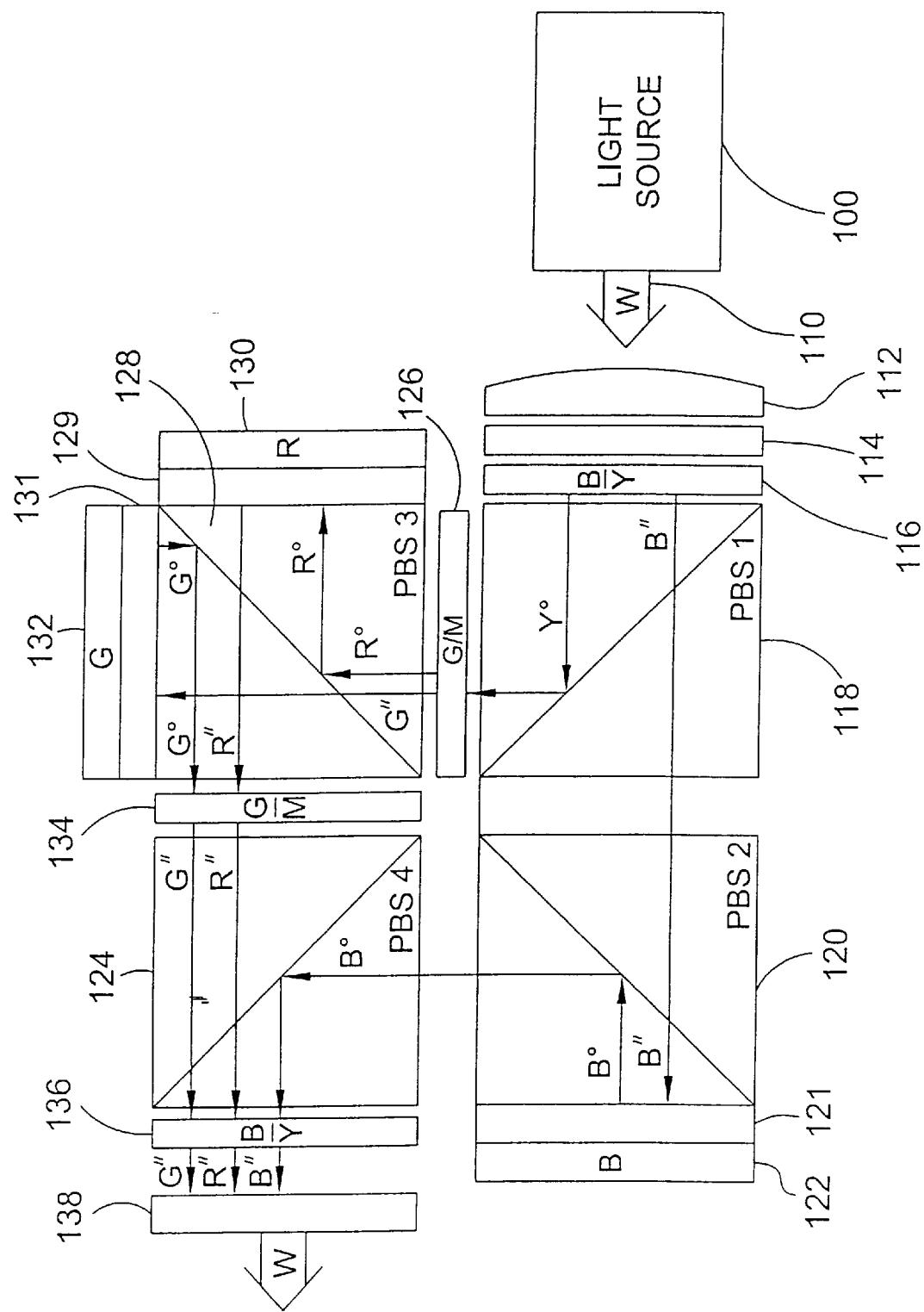
FIG. 2 is a diagram of a second embodiment of the present invention.

A second embodiment of the invention is shown in FIG. 2. This second embodiment is similar to the first embodiment shown in FIG. 1, except that it also incorporates light doubler elements. A first light doubler 121 is located between the second polarizing beamsplitter 120 and the first reflective modulator panel 122. Similarly, second and third light doublers 129, 131 are located between the third polarizing beamsplitter 128 and the second and third reflective modulator panels 130, 132, respectively.

As described above, when the reflective modulator panels are ferroelectric liquid crystal based modulators, which require DC balancing, the light doublers can convert inverse frames of modulated image data back into normal image data The use of the light doublers eliminates the need to blank alternate frames of image data.

Figure 3:
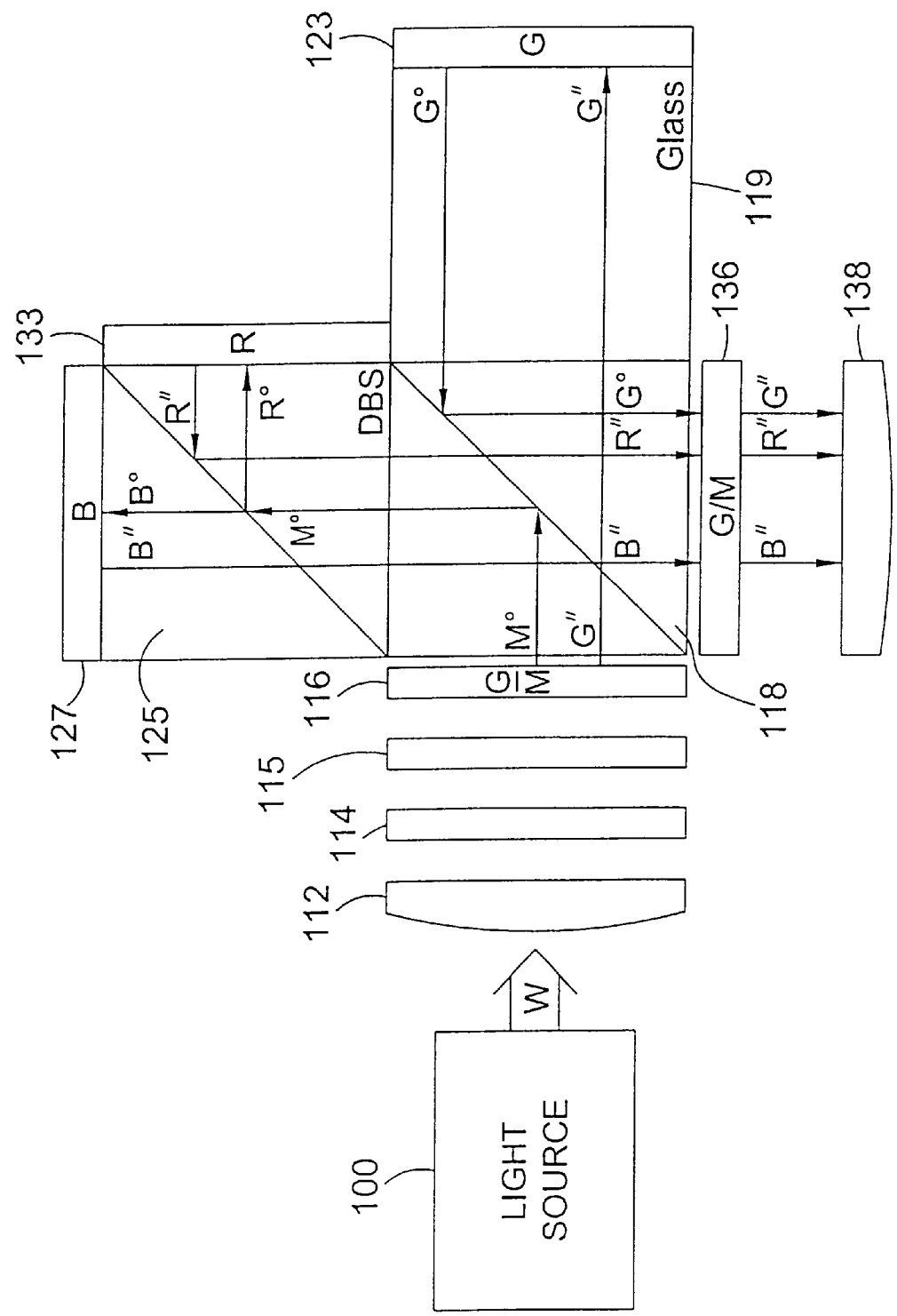
FIG. 3 is a diagram of a third embodiment of the present invention.

A third embodiment of the present invention is shown in FIG. 3. This third embodiment utilizes a single polarizing beamsplitter 118 and a single dichroic beamsplitter 125 to separate light into three spectrums.

Light from a light source 100 is collimated by collimating lens 112. The collimated light is polarized by a first polarizer 114. The polarized light then passes through a clean-up polarizer 115, which ensures that all the light has the same polarization orientation. The polarized light, which will have the S polarization orientation in this embodiment, then enters a first retarder stack 116.

In the embodiment shown in FIG. 3, the first retarder stack is a Green/Magenta retarder stack. Thus, the first retarder stack will rotate the polarization of green light to the P orientation, and allow magenta light (red and blue) to pass with the S orientation.

The polarizing beamsplitter 118 is configured to allow light having the P orientation to pass without deflection, and to deflect light having the S orientation along the diagonal line. Thus, the green light leaving the first retarder stack, because it has the P orientation, will pass straight through the polarizing beamsplitter 118 and into a glass spacer block 119. The green light will be transmitted through the glass spacer block 119, and impinge on a first reflective modulator panel 123.

The first reflective modulator panel 123 is designed to selectively modulate the polarization orientation of the reflected light in a spatial pattern. Unmodulated reflected green light will leave the first reflective modulator panel with the P orientation, which is the same orientation in which it arrived. Modulated reflected green light will leave the first reflective modulator panel with the S polarization orientation.

The unmodulated green light, because it has the P orientation, will pass back through the glass spacer block 119, and straight back through the polarizing beamsplitter 118. The unmodulated green light will then pass back through the first retarder stack 116 and to the light source 100.

Modulated green light will also pass back through the glass spacer block 119. However, because it has the S orientation, it will be reflected down towards an output end of the system.

The magenta light leaving the first retarder stack 116, because it has the S orientation, will be reflected upward toward a dichroic beamsplitter 125. The dichroic beamsplitter 125 is configured to pass light having blue wavelengths without deflection, and to reflect light having red wavelengths along the diagonal line. Ideally, the polarization orientation of the light will not affect the transmissive or reflective characteristics of the dichroic beamsplitter 125.

The blue light contained within the magenta light passing from the polarizing beamsplitter 118 will be transmitted straight through the dichroic beamsplitter 125 and impinge on a second reflective modulator panel 127. The red light contained within the magenta light entering the dichroic beamsplitter 125 will be reflected to a third reflective modulator panel 133.

The second reflective modulator panel 127 will reflect modulated blue light with the P polarization orientation, and unmodulated blue light with the S orientation. Both the modulated and the unmodulated portions of the blue light will pass straight back through the dichroic beamsplitter 125 and into the polarizing beamsplitter 118. The unmodulated portion of the blue light, because it has the S orientation, will be reflected back to the first retarder stack 116 and toward the light source 100. The modulated portion of the blue light, because it has the P orientation, will pass straight through the polarizing beamsplitter 118.

The third reflective modulator panel 133 will reflect modulated portions of the red light with the P orientation, and unmodulated portions of the red light with the S orientation. Both the modulated and unmodulated portions of the red light will be reflected by the dichroic beamsplitter 125 back to the polarizing beamsplitter 118. The unmodulated portion, because it has the S orientation, will be reflected by the polarizing beamsplitter 118 back through the first retarder stack 116 and toward the light source 100. The modulated portion of the red light, because it has the P orientation, will pass straight through the polarizing beamsplitter 118.

The light exiting the bottom of the polarizing beamsplitter 118 will include blue and red portions having the P orientation, and a green portion having the S orientation. The light will then pass through a second retarder stack 136 designed to convert all the colored light into the same polarization orientation. In the embodiment shown in FIG. 3, the second retarder stack 136 is a Green/Magenta retarder stack, same as the first retarder stack 116. Thus, the green light will be rotated into the P orientation, and the magenta light (blue and red) will pass through without a change in their polarization orientation. The light exiting the second retarder stack will then pass through projection optics 138.

In the embodiment shown in FIG. 3, as in the previous embodiments, the distance between each of the modulator panels and the projection optics 138 is substantially the same. Thus, the magnification of each of the different colored images by the projection optics 138 will be the same.

In the embodiment shown in FIG. 3, the first modulator panel is spaced from the polarizing beamsplitter 118 by a glass spacer block 119. The glass spacer block 119 is used to ensure that the distance from the first modulator panel 123 to the projection optics 138 is the same as the distance from the second and third modulator panels 127, 133 to the projection optics 138. Although this embodiment uses a glass block, alternative embodiments could use any type of spacer, including air. Glass is the preferred material since it does not affect the polarization orientation or propagation direction of the light, and has an index of refraction that is closely matched to the other elements of the system. In addition, the use of a solid spacer allows all the elements of the system to be rigidly attached to one another, which can help to maintain the alignment and integrity of the system.

Figure 4:
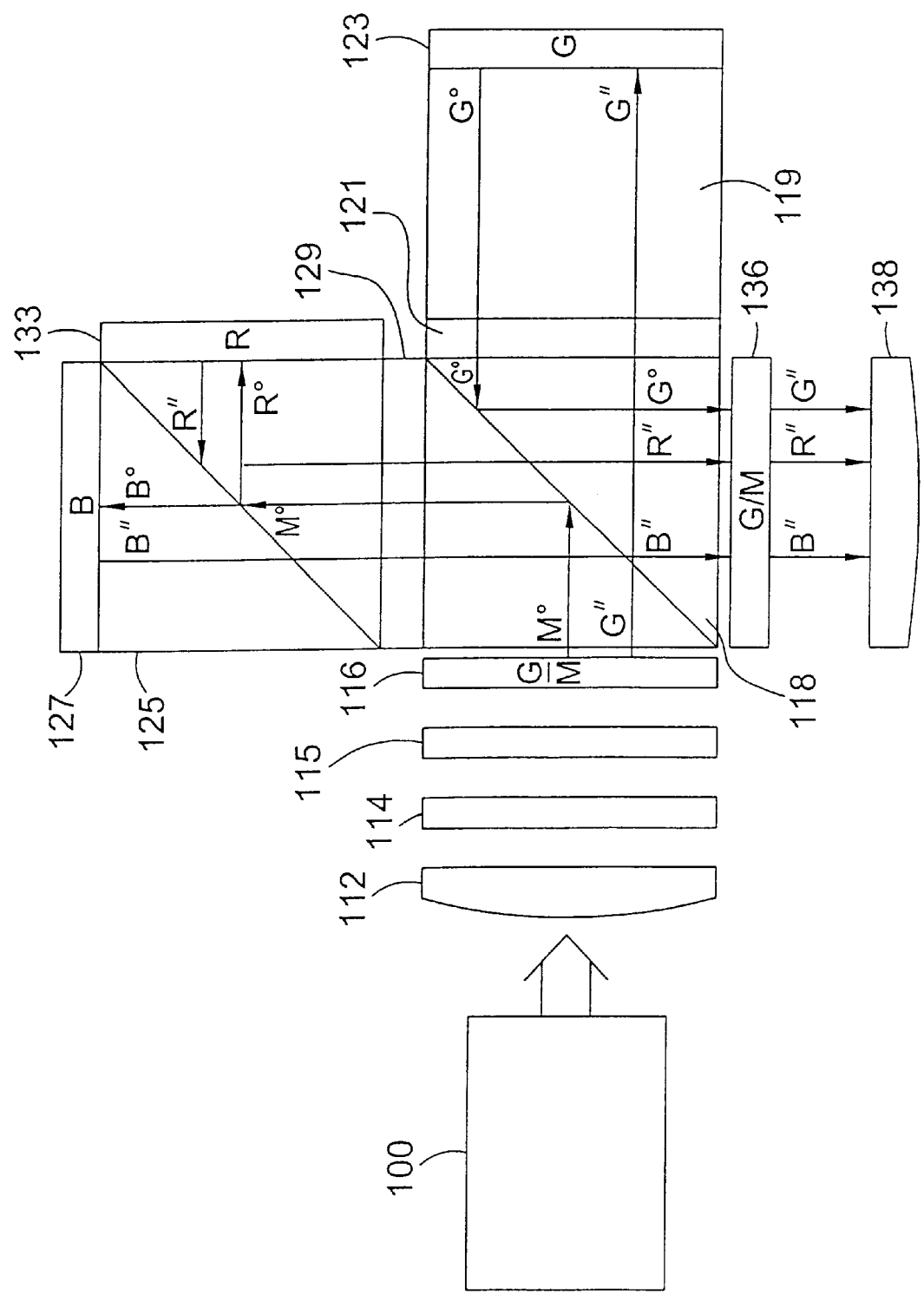
FIG. 4 is a diagram of a fourth embodiment of the present invention.
Figure 5:
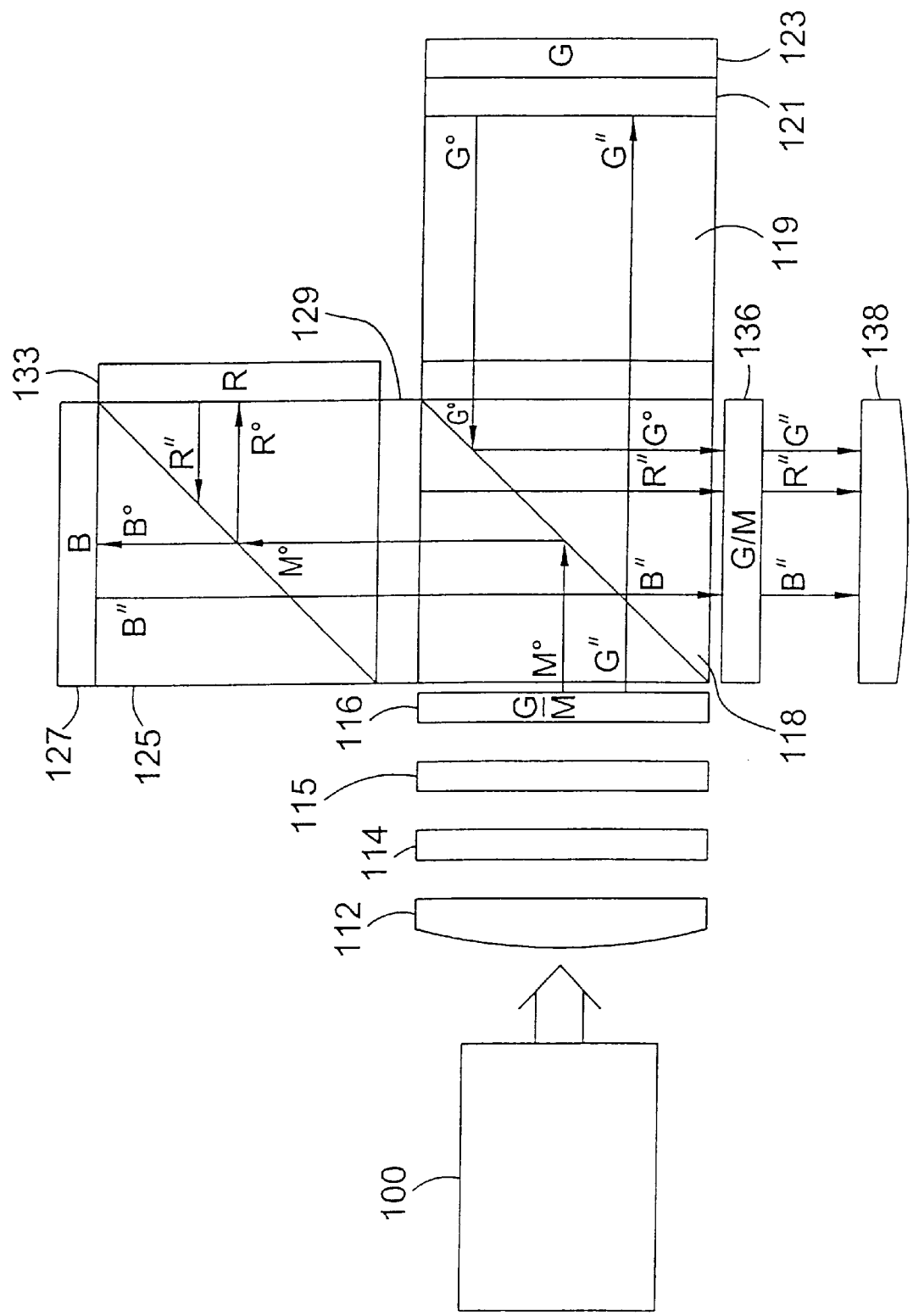
FIG. 5 is a diagram of a fifth embodiment of the present invention.

As described above, if ferroelectric liquid crystals are used for the reflective modulator panels, it is desirable to use light doubler elements. FIGS. 4 and 5 show fourth and fifth embodiments of the invention that utilize light doublers.

In the embodiment shown in FIG. 4, a first light doubler 121 is located between the polarizing beamsplitter 118 and the glass spacer block 119. The first light doubler 121 converts alternating inverse image frames from the first reflective modulator panel 123 back into normal image frames. A second light doubler 129 is located between the polarizing beamsplitter 118 and the dichroic beamsplitter 125. The second light doubler 129 converts alternating inverse image frames from the second and third reflective modulator panels 127, 133 back into normal image frames.

Because the reflection directions of the red and blue portions of the light within the dichroic beamsplitter 125 are not affected by the polarization orientation of the light, it is possible to locate the second light doubler 129 between the polarizing beamsplitter 118 and the dichroic beamsplitter 125. This also allows one light doubler to operate on the light from both the second and the third reflective modulator panels 127, 133. In alternate embodiments, however, it would be possible to replace the second light doubler 129 with two light doublers that are located, respectively, adjacent the second and third reflective modulator panels 127, 133.

In the fifth embodiment, shown in FIG. 5, the first light doubler 121 is moved to a location between the glass spacer block 119 and the first reflective modulator panel 123.

In the alternate embodiments shown in FIGS. 4 and 5, the distance between each of the reflective modulator panels and the projection optics remains the same, thus ensuring a clear, in-focus image.

In the embodiments described above, the light source 100 provided unpolarized white light. In alternative embodiments, such a light source could be replaced with a light source that provides polarized light. In these alternative embodiments, there would be no need for polarizing elements.

Also, in each of the embodiments described above, a polarizer element is used to convert unpolarized light. In alternative embodiments, a polarization conversion system, with or without a clean-up polarizer could be used in place of the polarizer element. Such devices are described in U.S. application Ser. No. 09/165,127, filed Oct. 2, 1998, the contents of which are hereby incorporated by reference. For instance, in the embodiment shown in FIG. 3, the element labeled with reference No. 114 could be a polarization conversion system, and the element labeled 115 could be the clean-up polarizer.

The light source in any embodiment of the invention could be any type of device capable of outputting light, such as light bulbs that utilize a filament, metal halide bulbs, lasers, light emitting diodes, fluorescent lights, gas filled discharge tubes, electroluminescent materials, and plasma based light sources that utilize microwaves as an excitation source, such as the devices described in U.S. Pat. No. 5,404,076.

Also, in the embodiments described above, white light is separated into three primary colors, the three primary colors are separately modulated, and the modulated light is re-combined to create a consolidated color image. In other embodiments of the invention, only two or more than three colors could be separately modulated. In addition, the colors need not be primary colors. An embodiment of the invention could be used to separate light into any combination of continuous or discontinuous spectrums, where the separated light is modulated and recombined. Moreover, embodiments of the invention may operate upon light partially or completely outside the visual range.

In the embodiments described above, a retarder stack is located at the output end to ensure that all portions of the light have the same polarization orientation before it enters the projection optics. This is done because Applicants believe this will lead to the greatest possible efficiency. However, alternative embodiments of the invention need not include the output retarder stack.

In each of the embodiments described above, the systems utilize reflective modulator panels. In alternative embodiments of the invention, transmissive modulator panels could be used in place of the reflective modulator panels.

In prior art systems, notch filters are added to block wavelengths of light that are between primary colors and that can harm the color saturation of the resulting images. These notch filters can result in up to a 15 percent loss in brightness.

In systems embodying the present invention, the input retarder stack, or possibly two or more of the retarder stacks can be designed to remove or reflect the wavelengths of light that harm color saturation. Use of the retarder stacks eliminates the need for separate notch filters, which lowers the cost of production. In addition, if the light is reflected back to the source, some brightness savings can be realized, thus increasing the overall efficiency and brightness of the system.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. For example, although a reflective modulator panel and a transmissive modulator panel are not structural equivalents in that the transmissive modulator panel allows light to pass therethrough and a reflective modulator panel reflects light, in the environment of modulation of light, a transmissive modulator panel and a reflective modulator panel may be equivalent structures.

What is claimed is:

1. A system for separating and combining three spectrums of light, comprising:

first, second, third and fourth polarizing beamsplitters, wherein each polarizing beamsplitter is configured to allow light having a first polarization orientation to pass therethrough, wherein each polarizing beamsplitter is configured to reflect light having a second polarization orientation, and wherein each polarizing beamsplitter has two interior sides adjacent two other polarizing beamsplitters, and two exterior sides that are not adjacent other polarizing beamsplitters; and a first retarder stack located adjacent an exterior side of the first polarizing beamsplitter;

a second retarder stack located adjacent an interior side of the first polarizing beamsplitter; and a third retarder stack located between interior sides of two of the polarizing beamsplitters.

2. The system of claim 1, further comprising a fourth retarder stack located adjacent an exterior side of the fourth polarizing beamsplitter.

3. The system of claim 2, wherein the first and fourth retarder stacks have substantially similar characteristics.

4. The system of claim 1, wherein the second and third retarder stacks have substantially similar characteristics.

5. The system of claim 1, further comprising first, second and third reflective modulator panels configured to selectively rotate the polarization orientation of reflected light in a spatial pattern.

6. The system of claim 5, wherein the first reflective modulator panel is located adjacent an exterior side of one of the polarizing beamsplitters.

7. The system of claim 6, wherein the second reflective modulator panel is located adjacent an exterior side of one of the polarizing beamsplitters.

8. The system of claim 7, wherein the third reflective modulator panel is located adjacent an exterior side of one of the polarizing beamsplitters that also has one of the first and second modulator panels adjacent its other exterior side.

9. The system of claim 5, further comprising first, second and third light doublers that are paired, respectively, with the first, second and third reflective modulator panels.

10. The system of claim 1, further comprising an input polarizer, located adjacent the first retarder stack, for polarizing input light.

11. The system of claim 1, wherein the first retarder stack is configured to receive polarized input light and to output a first spectrum in the first polarization orientation and a second spectrum in the second polarization orientation.

12. The system of claim 11, wherein the first polarizing beamsplitter is arranged to receive the light output from the first retarder stack in a first direction, and wherein the first polarizing beamsplitter is configured to allow light in the first spectrum, having the first polarization orientation, to pass therethrough in the first direction, and to reflect light in the second spectrum, having the second polarization orientation, in a second direction towards the third polarizing beamsplitter.

13. The system of claim 12, wherein the second polarizing beamsplitter is arranged to receive the light in the first spectrum, passing through the first polarizing beamsplitter in the first direction, and wherein the second polarizing beamsplitter is configured to reflect light having the second polarization orientation, and passing in a third direction that is opposite to the first direction, in the second direction towards the fourth polarizing beamsplitter.

14. The system of claim 13, further comprising a reflective modulator panel arranged on an exterior side of the second polarizing beamsplitter, wherein the first reflective modulator panel is configured to reflect incident light passing in the first direction so that it leaves the modulator panel in the third direction, and to selectively modulate the polarization orientation of the reflected light in a spatial pattern.

15. The system of claim 13, wherein the second retarder stack is arranged to receive the light in the second spectrum, having the second polarization orientation, that is reflected by the first polarizing beamsplitter, wherein the second retarder stack is configured to allow a third spectrum of the light to pass therethrough without a change in its polarization orientation, and wherein the second retarder stack is configured to change the polarization orientation of a fourth spectrum back to the first polarization orientation.

16. The system of claim 15, wherein the third polarizing beamsplitter is configured to reflect light passing in the second direction and having the second polarization orientation so that it travels in the third direction, wherein the third polarizing beamsplitter is configured to reflect light passing in a fourth direction, opposite to the second direction, so that it travels in the first direction towards the fourth polarizing beamsplitter, and wherein the third polarizing beamsplitter is configured to allow light having the first polarization orientation to pass therethrough without deflection.

17. The system of claim 16, further comprising a first reflective modulator panel arranged on an exterior side of the third polarizing beamsplitter opposite the first polarizing beamsplitter, and a second reflective modulator panel arranged on an exterior side of the third polarizing beamsplitter opposite the fourth polarizing beamsplitter, wherein the first reflective modulator panel is configured to reflect incident light passing in the second direction so that it leaves the first reflective modulator panel in the fourth direction, and to selectively modulate the polarization orientation of the reflected light in a spatial pattern, and wherein the second reflective modulator panel is configured to reflect incident light passing in the third direction so that it leaves the second reflective modulator panel in the first direction, and to selectively modulate the polarization orientation of the reflected light in a spatial pattern.

18. The system of claim 16, wherein the third retarder stack is arranged to receive light passing from the third polarizing beamsplitter towards the fourth polarizing beamsplitter, wherein the third retarder stack is configured to allow light in the third spectrum, having the first polarization orientation, to pass therethrough without a change in its polarization orientation, and wherein the third retarder stack is configured to change the polarization orientation of the light in the fourth spectrum from the second polarization orientation to the first polarization orientation.

19. The system of claim 18, wherein the fourth polarizing beamsplitter is configured to allow the light in the third and fourth spectrums to pass therethrough without deflection, and wherein the fourth polarizing beamsplitter is configured to reflect light in the first spectrum passing in the second direction, and having the second polarization orientation.

20. The system of claim 19, further comprising a fourth retarder stack arranged adjacent an exterior side of the fourth polarizing beamsplitter and arranged to receive light in the first, third and fourth spectrums passing from the fourth polarizing beamsplitter, wherein the fourth retarder stack is configured to allow light in the third and fourth spectrums to pass therethrough without a change in their polarization orientation, and wherein the fourth retarder stack is configured to change the polarization orientation of light in the first spectrum from the second polarization orientation to the first polarization orientation.

21. The system of claim 1, wherein at least one of the first, second and third retarder stacks reflects or blocks selected wavelengths of light.

22. The system of claim 21, wherein the reflected or blocked wavelengths of light are located substantially between the first and third spectrums of light.

23. The system of claim 21, wherein the reflected or blocked wavelengths of light are located substantially between the third and fourth spectrums of light.

24. A color projection system, comprising:
 first, second, third and fourth polarizing beamsplitters, arranged in a square pattern, wherein each polarizing beamsplitter is configured to allow light having a first polarization orientation to pass therethrough, wherein each polarizing beamsplitter is configured to reflect light having a second polarization orientation, and wherein each polarizing beamsplitter has two interior sides adjacent two other polarizing beamsplitters, and two exterior sides that are not adjacent other polarizing beamsplitters;
 a first retarder stack located on an exterior side of the first polarizing beamsplitter;
 a second retarder stack located adjacent an interior side of the first polarizing beamsplitter;
 a third retarder stack located between interior sides of two of the polarizing beamsplitters;
 a light source located adjacent the first retarder stack; and
 projection optics located adjacent the fourth polarizing beamsplitter.

25. The system of claim 24, further comprising a fourth retarder stack located adjacent an exterior side of the fourth polarizing beamsplitter.

26. The system of claim 24, further comprising first, second and third reflective modulator panels configured to selectively rotate the polarization orientation of reflected light in a spatial pattern.

27. The system of claim 26, wherein the system is configured so that substantially equal distances exist between the projection optics and each of the first, second and third modulator panels.

28. The system of claim 26, wherein the first reflective modulator panel is located adjacent an exterior side of one polarizing beamsplitter, and wherein the second and third reflective modulator panels are located adjacent exterior sides of another of the polarizing beamsplitters.

29. The system of claim 26, further comprising first, second and third light doublers that are paired, respectively, with the first, second and third reflective modulator panels.

30. A system for separating and combining three spectrums of light, comprising:
a polarizing beamsplitter;
an input retarder stack located adjacent a first side of the polarizing beamsplitter;
a spacer located adjacent a second side of the polarizing beamsplitter; and
a dichroic beamsplitter located adjacent a third side of the polarizing beamsplitter.

31. The system of claim 30, further comprising an output retarder stack located adjacent a fourth side of the polarizing beamsplitter.

32. The system of claim 31, wherein the input and output retarder stacks have substantially similar characteristics.

33. The system of claim 30, further comprising first, second and third reflective modulator panels configured to selectively rotate the polarization orientation of reflected light in a spatial pattern.

34. The system of claim 33, wherein the first reflective modulator panel is located adjacent a side of the spacer opposite the polarizing beamsplitter, wherein the second reflective modulator panel is located adjacent a first exterior side of the dichroic beamsplitter, and wherein the third reflective modulator panel is located adjacent a second exterior side of the dichroic beamsplitter.

35. The system of claim 34, further comprising first, second and third light doublers that are paired, respectively, with the first, second and third reflective modulator panels.

36. The system of claim 34, further comprising first and second light doublers, wherein the first light doubler operates on light modulated by the first reflective modulator panel, and wherein the second light doubler operates on light modulated by the second and third modulator panels.

37. The system of claim 36, wherein the first light doubler is located between the polarizing beamsplitter and the spacer.

38. The system of claim 36, wherein the first light doubler is located between the spacer and the first reflective modulator panel.

39. The system of claim 36, wherein the second light doubler is located between the polarizing beamsplitter and the dichroic beamsplitter.

40. The system of claim 30, further comprising an input polarizer, located adjacent the input retarder stack, for polarizing input light.

41. The system of claim 30, further comprising a polarization conversion system, located adjacent the input retarder stack for polarizing input light.

42. The system of claim 41, further comprising a clean-up polarizer located between the polarization conversion system and the input retarder stack.

43. The system of claim 30, wherein the first retarder stack is configured to receive polarized input light passing in a first direction, and to output a first spectrum of light in a first polarization orientation and a second spectrum of light in a second polarization orientation.

44. The system of claim 43, wherein the polarizing beamsplitter is configured to direct light having the first polarization orientation that is received from the input retarder stack towards the spacer, wherein the polarizing beamsplitter is configured to direct any light having the second polarization orientation that is received from the input retarder stack towards the dichroic beamsplitter, wherein the polarizing beamsplitter is configured to direct any light having the second polarization orientation that is received from the spacer towards a fourth side of the polarizing beamsplitter, and wherein the polarizing beamsplitter is configured to direct any light having the first polarization orientation that is received from the dichroic beamsplitter towards the fourth side of the polarizing beamsplitter.

45. The system of claim 44, wherein the dichroic beamsplitter is configured to receive the light in the second spectrum, having the second polarization orientation, from the polarizing beamsplitter, to direct a third spectrum of the received light toward a first exterior side of the dichroic beamsplitter and to direct a fourth spectrum of the received light toward a second exterior side of the dichroic beamsplitter, wherein the dichroic beamsplitter is configured to direct any light in the third spectrum returned from the first exterior side towards the polarizing beamsplitter, and wherein the dichroic beamsplitter is configured to direct any light in the fourth spectrum returned from the second exterior side towards the polarizing beamsplitter.

46. The system of claim 45, further comprising a first reflective modulator panel located adjacent the first exterior side of the dichroic beamsplitter, and a second reflective modulator panel located adjacent the second exterior side of the dichroic beamsplitter, wherein the first reflective modulator panel is configured to reflect and selectively modulate light in the third spectrum, and wherein the second reflective modulator panel is configured to reflect and selectively modulate light in the fourth spectrum.

47. The system of claim 46, further comprising a third reflective modulator panel, located adjacent an exterior side of the spacer opposite the polarizing beamsplitter, wherein the third reflective modulator panel is configured to reflect and selectively modulate light in the first spectrum.

48. A color projection system, comprising:
a polarizing beamsplitter;
an input retarder stack located adjacent a first side of the polarizing beamsplitter;
a light source located adjacent the first retarder stack;
a spacer located adjacent a second side of the polarizing beamsplitter;
a dichroic beamsplitter located adjacent a third side of the polarizing beamsplitter; and
projection optics located adjacent a fourth side of the polarizing beamsplitter.

49. The system of claim 48, further comprising first, second and third reflective modulator panels configured to selectively rotate the polarization orientation of reflected light in a spatial pattern.

50. The system of claim 49, wherein the first reflective modulator panel is located adjacent a side of the spacer opposite the polarizing beamsplitter, wherein the second reflective modulator panel is located adjacent a first side of the dichroic beamsplitter, and wherein the third reflective modulator panel is located adjacent a second side of the dichroic beamsplitter.

51. The system of claim 50, further comprising first, second and third light doublers that are paired, respectively, with the first, second and third reflective modulator panels.

52. The system of claim 50, further comprising first and second light doublers, wherein the first light doubler operates on light modulated by the first reflective modulator panel, and wherein the second light doubler operates on light modulated by the second and third reflective modulator panels.

53. The system of claim 48, further comprising an output retarder stack located adjacent a fourth side of the polarizing beamsplitter.

54. The system of claim 47, wherein an output retarder stack is configured to ensure that the polarization orientation of light in the first, third and fourth spectrums is the same.

55. A method of separating, modulating and re-combining spectrums of light, comprising the steps of:

conditioning input light with a first retarder stack so that input light in a first spectrum has a first polarization orientation, and input light in a second spectrum has a second polarization orientation;

separating the light in the first spectrum from the light in the second spectrum using a polarizing beamsplitter;

conditioning the separated light in the second spectrum using a second retarder stack so that light in a third spectrum has the first polarization orientation, and light in a fourth spectrum has the second polarization orientation;

separating the light in the third spectrum from the light in the fourth spectrum using a polarizing beamsplitter;

modulating light in the first, third and fourth spectrums separately, using first, second and third modulators; and recombining the first, third and fourth modulated spectrums of light.

56. A method of separating, modulating, and re-combining spectrums of light, comprising the steps of:

conditioning input light with a first retarder stack so that input light in a first spectrum has a first polarization orientation, and input light in a second spectrum has a second polarization orientation;

separating the light in the first spectrum from the light in the second spectrum using a polarizing beamsplitter;

separating light in the separated second spectrum into third and fourth spectrums of light with a dichroic beamsplitter;

modulating the light in the first, third and fourth spectrums separately, using first, second and third modulators; and recombining the first, third and fourth modulated spectrums of light.

57. A system for separating input light into multiple spectra, comprising:

first, second, third and fourth polarizing beamsplitters, wherein each polarizing beamsplitter is configured to allow light having a first polarization orientation to pass therethrough, and wherein each polarizing beamsplitter is configured to reflect light having a second polarization orientation; and first, second and third retarder stacks, wherein the first, second, third and fourth polarizing beamsplitters and the first, second and third retarder stacks are arranged and optically coupled such that said input light is separated into said multiple spectra.

58. A system for separating and combining multiple spectra of light, comprising:

a polarizing beamsplitter;

an input retarder stack located adjacent a first side of the polarizing beamsplitter; and a dichroic beamsplitter located adjacent a second side of the polarizing beamsplitter.

59. A system for combining multiple input spectra, comprising:

first, second, third and fourth polarizing beamsplitters, wherein each polarizing beamsplitter is configured to allow light having a first polarization orientation to pass therethrough, and wherein each polarizing beamsplitter is configured to reflect light having a second polarization orientation; and first, second and third retarder stacks, wherein the first, second, third and fourth polarizing beamsplitters and the first, second and third retarder stacks are arranged and optically coupled such that said multiple input spectra are combined.

* * * * *